(12) United States Patent
Fehr

(10) Patent No.: US 9,746,661 B2
(45) Date of Patent: Aug. 29, 2017

(54) PROTECTIVE DEVICE FOR A LENS

(71) Applicant: KRAUSS-MAFFEI WEGMANN GMBH & CO. KG, Munich (DE)

(72) Inventor: Michael Fehr, Kassel (DE)

(73) Assignee: KRAUSS-MAFFEI WEGMANN GMBH & CO. KG, Munich (DE)

( * ) Notice: Subject to any disclaimer, the term of this patent is extended or adjusted under 35 U.S.C. 154(b) by 0 days.

(21) Appl. No.: 14/760,488

(22) PCT Filed: Jan. 13, 2014

(86) PCT No.: PCT/DE2014/100004
§ 371 (c)(1),
(2) Date: Jul. 13, 2015

(87) PCT Pub. No.: WO2014/108128
PCT Pub. Date: Jul. 17, 2014

(65) Prior Publication Data
US 2015/0355453 A1 Dec. 10, 2015

(30) Foreign Application Priority Data
Jan. 14, 2013 (DE) .................. 10 2013 100 331

(51) Int. Cl.
G02B 23/16 (2006.01)
F41H 5/26 (2006.01)
F41H 5/013 (2006.01)

(52) U.S. Cl.
CPC ............ G02B 23/16 (2013.01); F41H 5/26 (2013.01); F41H 5/013 (2013.01)

(58) Field of Classification Search
CPC . G02B 23/16; G02B 7/00; G02B 7/02; G02B 7/18; G02B 7/182; G03B 11/04; F41H 5/26; B60R 1/06; B60R 1/10
USPC .......................................... 359/402, 405, 511
See application file for complete search history.

(56) References Cited

U.S. PATENT DOCUMENTS

| | | | |
|---|---|---|---|
| 4,004,465 A | 1/1977 | Dinges et al. | |
| 4,264,174 A * | 4/1981 | Lange .................... | G03B 17/04 396/349 |
| 4,451,130 A * | 5/1984 | Yan ........................ | G03B 17/04 396/336 |
| 5,375,505 A | 12/1994 | Sutton | |
| 5,617,167 A * | 4/1997 | Kaji ........................ | G03B 17/04 396/448 |

(Continued)

FOREIGN PATENT DOCUMENTS

| | | |
|---|---|---|
| CA | 2735556 A1 | 3/2010 |
| DE | 1789001 A1 | 1/1972 |

(Continued)

OTHER PUBLICATIONS

International Search Report, International Application No. PCT/DE2014/100004, mailed Apr. 16, 2014.

*Primary Examiner* — Frank Font
(74) *Attorney, Agent, or Firm* — Thompson Hine LLP

(57) ABSTRACT

A protective device for a lens (2) having a protective hood (3) which protects a lens mount against ballistic effects, the protective hood (3) having a sight opening (4) for the lens (2), and a closing flap (5) for closing the sight opening (4), wherein the closing flap (5) can be rotated relative to the protective hood (3), wherein the rotary axis (D) of the closing flap (5) runs through the lens mount.

20 Claims, 8 Drawing Sheets

(56) References Cited

U.S. PATENT DOCUMENTS

| | | | | |
|---|---|---|---|---|
| 5,987,263 | A * | 11/1999 | Toyoda | G03B 15/05 396/178 |
| 6,247,855 | B1 * | 6/2001 | Motohashi | G03B 17/02 396/448 |
| 6,799,854 | B1 * | 10/2004 | Steiner | G02B 23/16 359/511 |
| 2002/0005997 | A1 * | 1/2002 | Oba | G02B 7/04 359/819 |
| 2003/0133709 | A1 * | 7/2003 | Kobayashi | G03B 11/041 396/448 |
| 2009/0263651 | A1 * | 10/2009 | Cook | B32B 17/10027 428/339 |
| 2010/0158503 | A1 * | 6/2010 | Fujiwara | G03B 17/00 396/448 |
| 2011/0155145 | A1 * | 6/2011 | Chua | A61B 19/081 128/849 |
| 2011/0211062 | A1 | 9/2011 | Kamps et al. | |
| 2012/0062789 | A1 * | 3/2012 | Sasaki | G03B 17/00 348/373 |

FOREIGN PATENT DOCUMENTS

| | | | |
|---|---|---|---|
| DE | 202004014825 U1 | 11/2004 | |
| DE | 102008039512 A1 | 2/2010 | |
| DE | 102008046453 A1 | 3/2010 | |
| DE | 202009010193 U1 | 12/2010 | |
| FR | 2509034 A1 | 1/1983 | |
| RU | 2308665 C1 * | 10/2007 | F41H 5/26 |

* cited by examiner

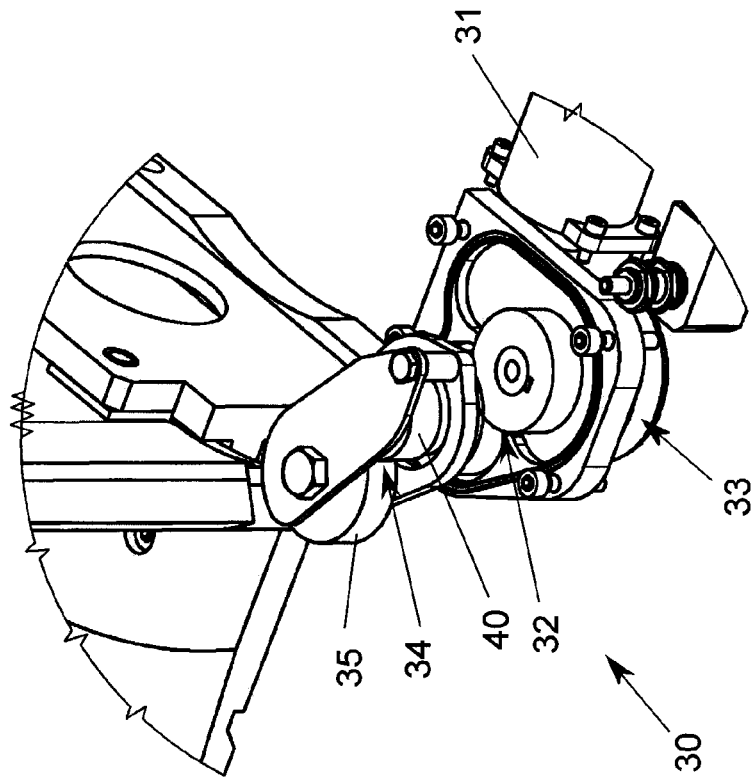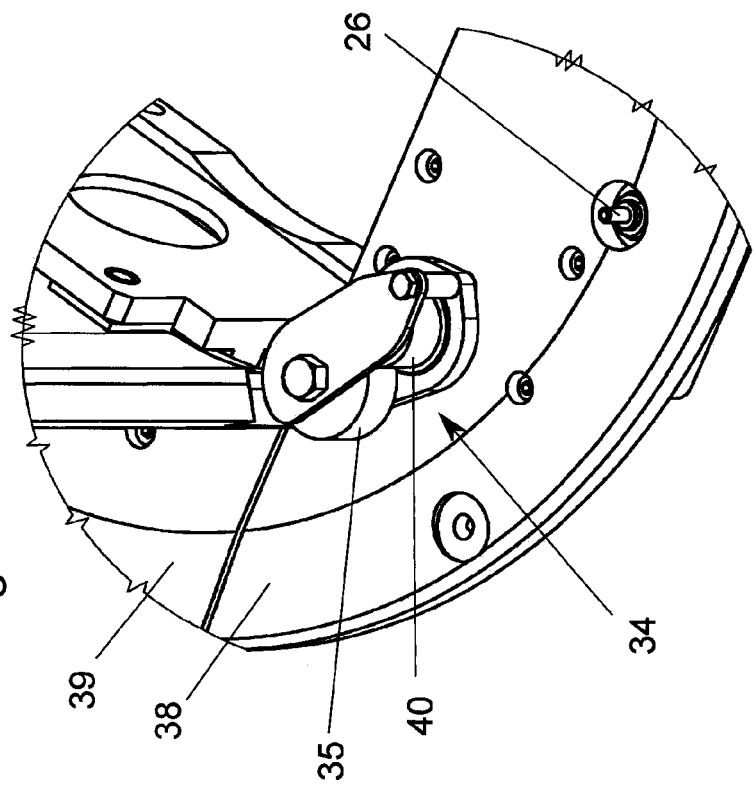

PROTECTIVE DEVICE FOR A LENS

TECHNICAL FIELD

The invention concerns a protective device for a lens with a protective hood protecting a lens mount against ballistic effects, having a sight opening for the lens, and a closing flap for closing the sight opening. Furthermore, it concerns an optical device with a lens, as well as a vehicle.

BACKGROUND

Protective hoods for the protection of lenses are known in many different designs, especially for military vehicles. As a rule, these have one or more doorlike swiveling flaps for closing the sight opening of the lens, as is described for example in DE 10 2008 039 512 A1. For opening and closing, these flaps are pivoted through a relatively large angle range from a position closing the sight opening to a position adjacent to the outside of the protective hood. Since the protective hoods are usually rectangular in shape and the pivot axis is situated in a corner, the pivot angle is often 270 degrees. The swivel range is thus very large and a lot of room is needed for the swiveling of the flap next to the protective hood. Since this room is generally not available in all placements of the optical device, the optical device must generally first be turned into a defined azimuth position for the opening and closing of the flap, before the sight opening can be closed. This leads to long closure times, so that after the command for a closure has been given there would still be a relatively long time before the closing flap has been shut. During this time, the lens being protected can get damaged, e.g., by a ballistic projectile or a blinding laser device.

SUMMARY

Therefore, the problem which the invention proposes to solve is to configure the aforementioned protective device so that a prompt closing of the sight opening with the closing flap is possible.

This problem is solved in a protective device according to the preamble of claim 1 in that the closing flap can rotate relative to the protective hood, and the axis of rotation of the closing flap runs through the lens mount.

By arranging the axis of rotation of the closing flap such that it runs through the lens mount, a very fast closing of the sight opening is possible. The angle of rotation of the closing flap can be substantially reduced in this way, generally to from 45 to 120 degrees. Preferably, the angle of rotation corresponds to the aperture angle of the sight opening, while it can also be down to 30%, especially down to 10%, more or less. Preferably the axis of rotation is firmly disposed relative to the protective hood.

Furthermore, a rotation of the closing flap is possible very close to the protective hood, so that the closing flap requires very little room when closing the sight opening. In this way, it is possible for the area around the optical device to be available for other equipment, since the space does not have to be kept clear for a broad pivoting movement of the closing flap. In fact, the closing flap can even be opened and closed within the rotation contour of the optical device, preferably even within the rotation contour of the protective hood.

In a modification of the invention it is proposed that the closing flap is led along the outside of the protective hood. Alternatively to leading the closing flap along an outer contour of the protective hood, however, the closing flap can also be led along an inner side of the protective hood.

Especially preferably, the closing flap can rotate along an outer contour of the protective hood. This accomplishes an especially compact and stable design, since the protective hood can be braced against the protective hood when external forces are at work, especially during gunfire.

Moreover, the closing flap can be mounted on the hood and/or at the base of the hood. Especially preferably, the closing flap is mounted on the hood by a rotary bearing. In addition or alternatively, the closing flap can be lead in a rail at the base of the protective hood. This results in an especially stable and deformation-free guiding of the protective hood when opening and closing the sight opening.

Preferably the protective hood is a separate part, which can be secured, especially detachably, on the lens and thus increases the protection for the lens, for example, as additional armoring. But the protective hood can also be part of the lens and be integrated for example in the housing of the lens or be formed by the housing of the lens. The protective hood, together with the closing flap, can preferably provide protection all around, but this is not absolutely required. In particular, it provides protection at the sides and/or at the top.

A modification of the invention has the protective hood and the closing flap able to be coupled to the lens in terms of a rotary movement of the lens. By coupling the lens and the protective hood, the protective hood can be rotated in azimuth with the positioning drive units of the lens, so that the visual field of the optical device is oriented in azimuth along with the sight opening.

For the closing of the sight opening, the closing flap can be moved into the visual field of the optical device. Especially preferably, the hood and the optical device can not only be coupled, but are permanently coupled. Especially preferably, the closing flap is also coupled to an azimuth movement of the optical device, but it is moved relative to the optical device for the opening and closing or during the opening and closing of the closing flap.

Especially to keep within the stowage dimensions it can be advantageous to arrange the closing flap removably on the protective hood. Due to the removable arrangement of the closing flap, it can be taken down in or on a means of transportation prior to the loading of the vehicle. This can reduce the height of the vehicle contour, so that the stowage dimensions are adhered to. Moreover, the protective hood can also be arranged removably on the vehicle and/or on the lens.

It is especially advantageous for a bearing cover, the closing flap and/or the protective hood to have an adjusting device for orienting the closing flap when installing the closing flap on the protective hood. Especially preferably, the adjusting device has a pin for orienting. This simplifies and speeds up the installation, since in particular no time-consuming adjustment is needed.

According to another embodiment of the invention, the protective device has a drive unit for rotating the closing flap. This enables especially easy opening and closing of the protective flap. Furthermore, in this case the closing flap can also be opened and closed automatically. For example, whenever an incoming projectile or a laser, especially a blinding laser, has been detected.

Preferably the closing flap is driven at its periphery, especially in the bottom area. For this, the protective flap can have a drive element such as a toothed rack running along the periphery.

The motor can be arranged fixed to the hood or fixed to the closing flap. Preferably the drive unit is electrical, pneumatic, or hydraulic. The drive unit can have a friction clutch. A friction clutch on the one hand protects the motor against overload when the closing flap is jammed, e.g., due to an artillery hit, and on the other hand it facilitates a manual opening and closing of the closing flap.

Furthermore, the protective device can have at least one stop for the closing flap in an open position and/or in a closed position. Preferably, it has one stop for the open position and one stop for the closed position. These can establish the particular end position of the closing flap. The protective device can also have at least one end switch to detect an open position and/or a closed position. Especially preferably, the protective device has one end switch in each case for detecting the open and the closed position.

Moreover, it has proven to be advantageous for the protective device to have an end position fixation device for the closing flap in an open position and/or a closed position. Due to a fixation in an end position, the closing flap is given an additional support. In this way, the flap has less flutter in its end positions.

Preferably the aperture of the sight opening is less than 120 degrees, preferably less than 100 degrees, especially preferably less than 80 degrees. Advantageously, the aperture of the sight opening is at least 45 degrees, more preferably at least 70 degrees. The closing flap can have a curved plate with a partially circular cross section in particular. The plate is thus preferably formed as a segment of a cylinder surface. Especially preferably, the plate forms a part of the closing flap which closes the sight opening. Furthermore, the closing flap can have a leg by which it is mounted with the protective hood. Preferably, the length of the leg essentially corresponds to the radius of the curved plate or cylinder surface segment. It is also advantageous for the radius of the curved plate to correspond essentially to the distance between the plate and the axis of rotation of the closing flap.

Furthermore, as the solution of the above problem, it is proposed that an optical device of the aforementioned kind have a protective device of the above described kind.

The optical device can have an angled mirror or a periscope as the lens.

The axis of rotation of the closing flap can run through the optical device, in particular, through the angled mirror. Preferably, the axis of rotation runs essentially vertically. The azimuth axis of rotation of the optical device and the axis of rotation essentially run in parallel. Preferably, these two axes of rotation are not more than 25 cm apart, especially preferably not more than 10 cm. It is especially favorable when the two axes of rotation are essentially coaxial. Alternatively, however, the axis of rotation of the closing flap can also run essentially horizontal. In this case, the closing flap rotates upward or downward for the opening or closing of the sight opening.

Furthermore, the above described problem is solved in a vehicle as described above by the above described protective device and/or the above described optical device.

BRIEF DESCRIPTION OF THE DRAWINGS

The advantages described above are achieved. Especially preferably, the protective device is arranged on the vehicle or a turret roof of the vehicle. The optical device can be arranged on the vehicle roof or the turret roof and project into the interior of the vehicle.

FIG. 13 shows a view of the drive unit of the closing flap, and FIG. 14 shows another view of the drive unit of the closing flap.

DETAILED DESCRIPTION

Figure 1:
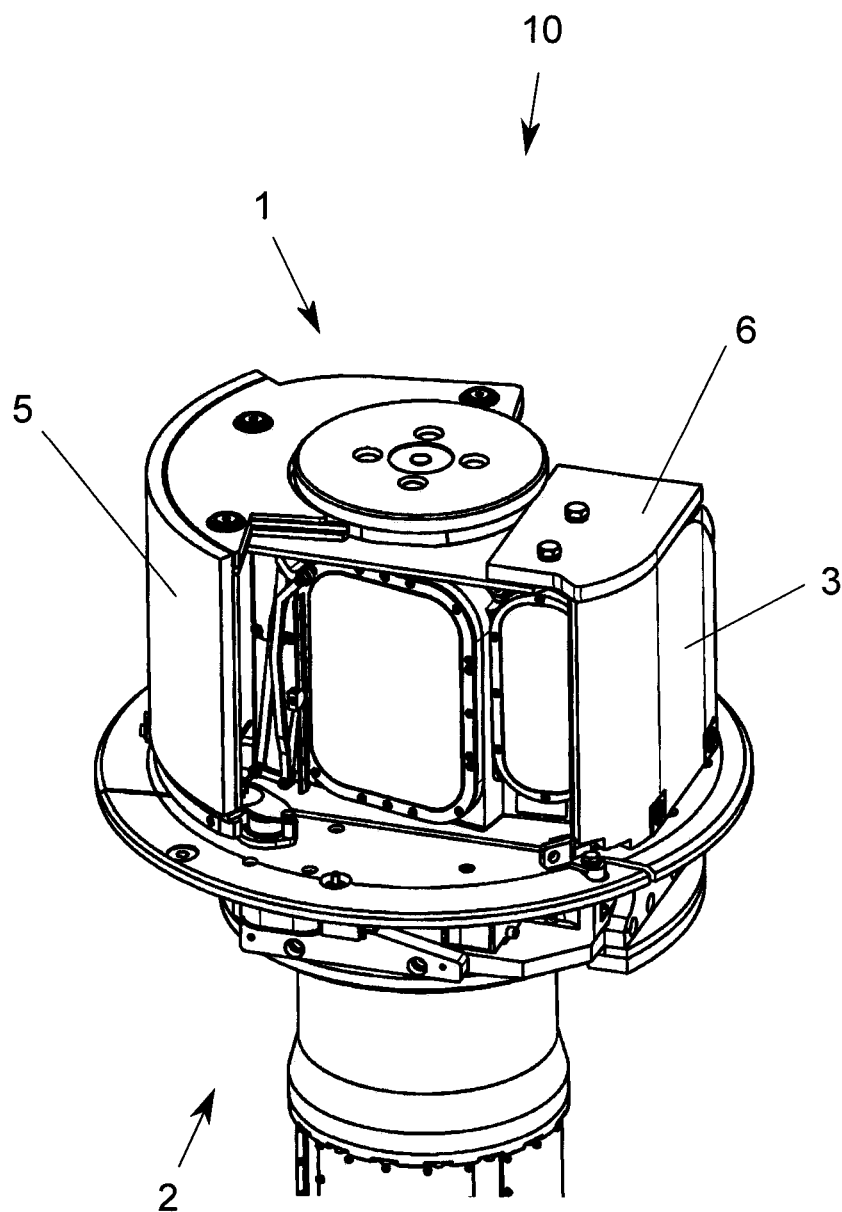
FIG. 1 shows a three-dimensional view of an optical device with protective device and mounted lens.

FIG. 1 shows a protective device 1 with a lens 2, which together form an optical device 10. The optical device 10 can contain one or more angled mirrors, periscopes, cameras, night vision devices, range finders and other optics. It is used to observe the surroundings from a military vehicle. The optical device 10 can be led through the vehicle roof or arranged on the vehicle roof. The optical device 10 can be arranged to rotate on the vehicle.

The protective device 1 is arranged over the lens 2 for protection, especially against ballistic threats. Thus, the protective device 1 accommodates a portion of the lens 2 inside the protective hood 3. The lens mount 41 is accordingly formed by the inside of the protective hood, especially by the portion of the interior where the lens 2 is arranged. In the sample embodiment, the protective hood 3 constitutes a separate part from the lens 2. Alternatively, the protective hood 3 can also be part of the housing of the lens 2.

The protective device 1 is armored. The ballistic protection elements of the protective device 1, especially the closing flap 5, consist of an armor material, especially a metal-like steel. The closing flap 5 can be rotated in front of the sight opening for the closing of the sight opening 4 of the lens 2, so that protection of the sight window of the lens 2 is achieved.

Figure 2:
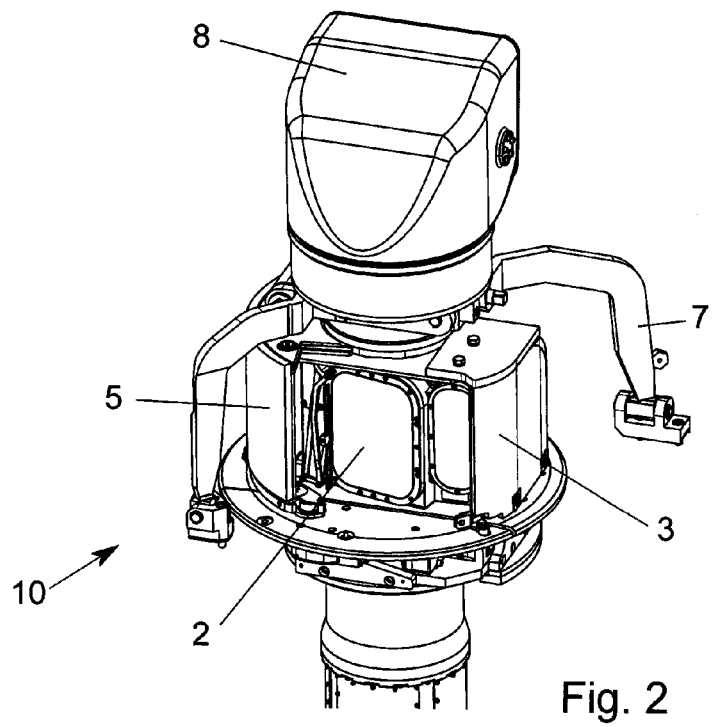
FIG. 2 shows the optical device of FIG. 1 with a tripod and another device.
Figure 3:
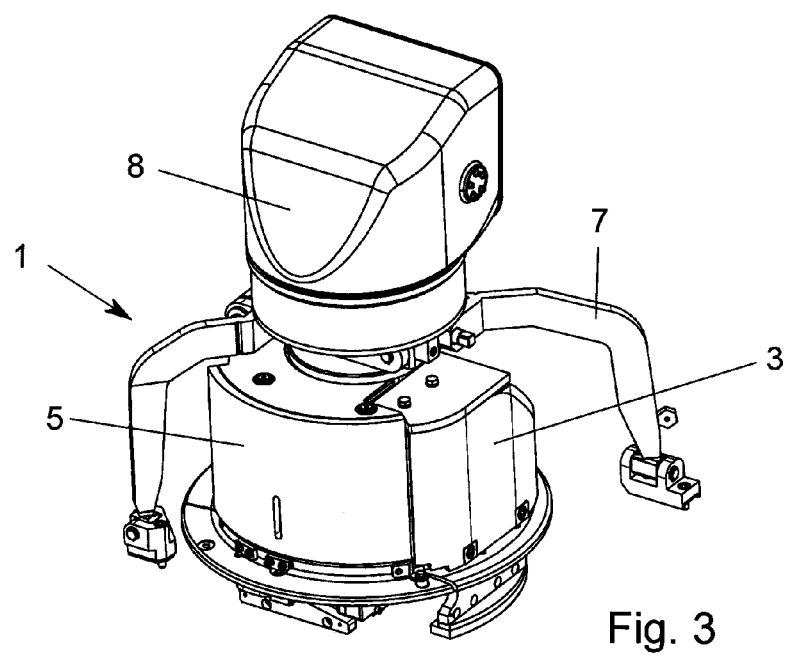
FIG. 3 shows the optical device with closed closing flap and the tripod with another device.

In addition, as shown in FIGS. 2 and 3, an additional device 8 is arranged above the protective device 1. Preferably the additional device 8 stands on a tripod 7. It can be in particular a radar jamming device or another electronic and/or optical instrument.

Without the protective device 1 configured according to the invention, the legs of the tripod 7 in many azimuth positions of the lens would be a hindrance to the closing flap deploying by rotation, so that the optical device 10 each time would have to be rotated into a particular azimuth position between two legs in order to close the flap. Since in the protective device 1 of the invention the axis of rotation D runs through the lens mount 41, the closing flap 5 can now be led closely along the protective hood 3 when opening and closing. Upon rotating, it runs closely along one side edge 9 of the sight opening 4. Accordingly, the closing flap 5 can be opened and closed in any azimuth position. In the sample embodiment, the axis of rotation D is fixed relative to the protective hood 3. The axis of rotation D does not move relative to the protective hood 3 upon opening and closing the closing flap 5.

Figure 4:
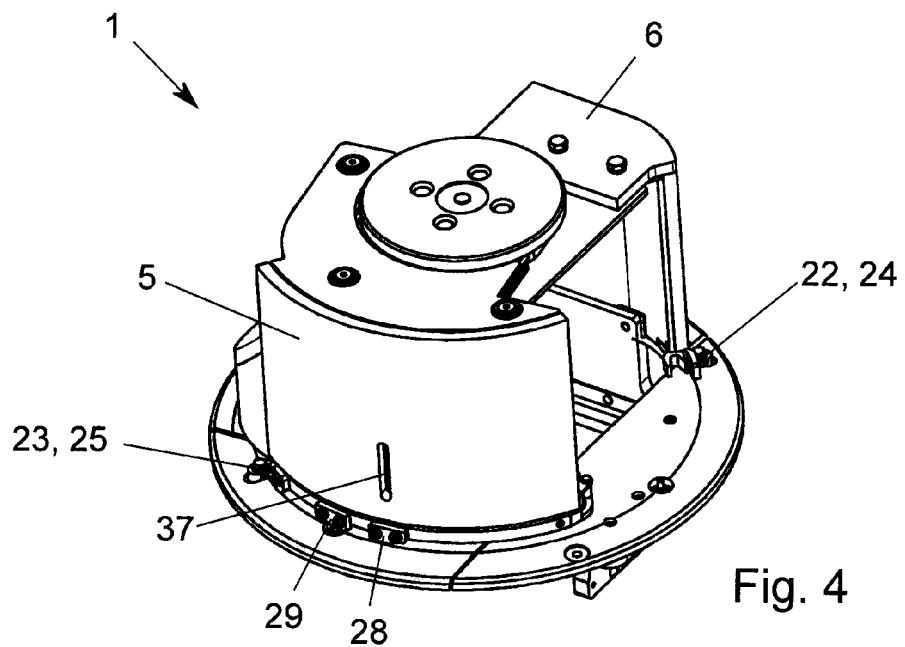
FIG. 4 shows a perspective view of the protective device of the optical device of FIGS. 1-3 shown with opened closing flap.
Figure 5:
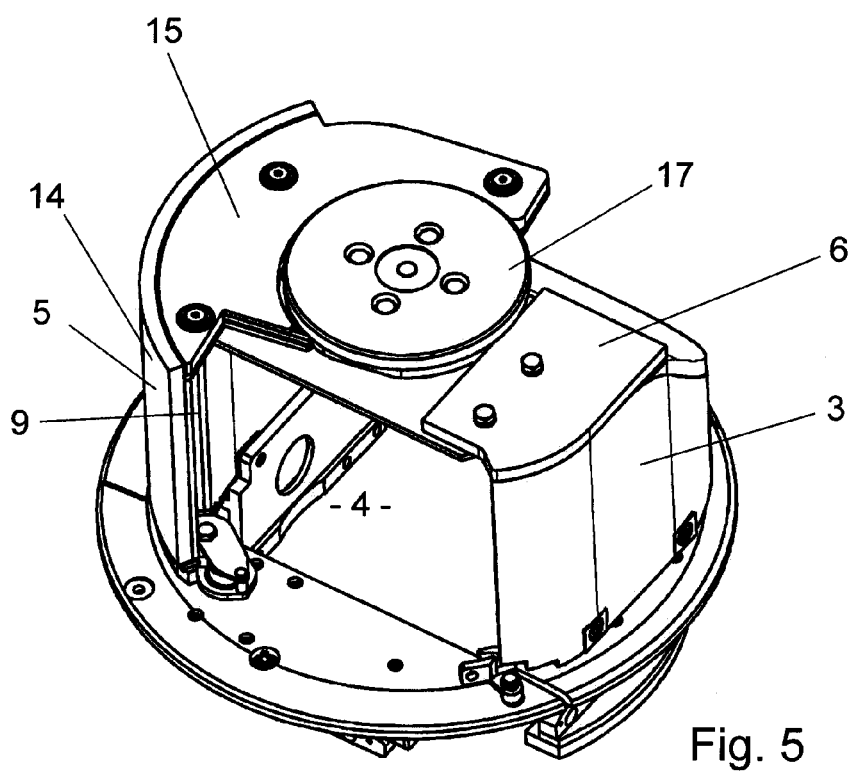
FIG. 5 shows another perspective view of the protective device of FIG. 4.

FIGS. 4 and 5 show the protective device 1 with opened closing flap 5. In the opened position, the closing flap 5 is arranged at the side of the protective hood 3. The closing flap 5 has a curved plate as a cylinder surface segment 14 and a leg 15. The closing flap is mounted on the protective hood 3. To strengthen the protective hood 3, a plate 6 is additionally arranged on the hood 3. The plate 6 essentially covers the surface on the top side of the protective hood 1 which is not covered by the closing flap 5. For the closing of the sight opening, the closing flap 5 is rotated along the edge 9 in front of the sight opening 4. In this process, the closing flap 5 runs around the protective hood 3.

Figure 6:
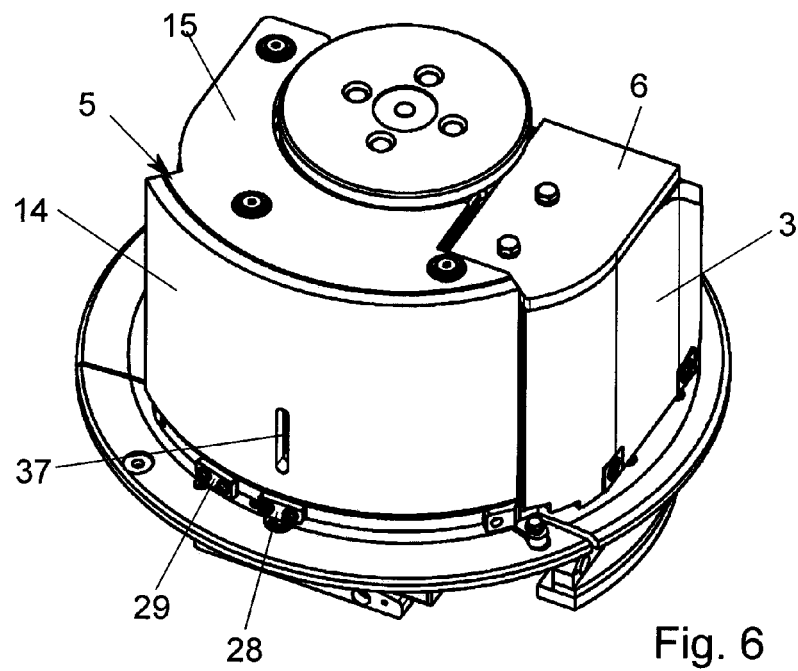
FIG. 6 shows a perspective view of the protective device of FIG. 4, shown with closed closing flap.
Figure 7:
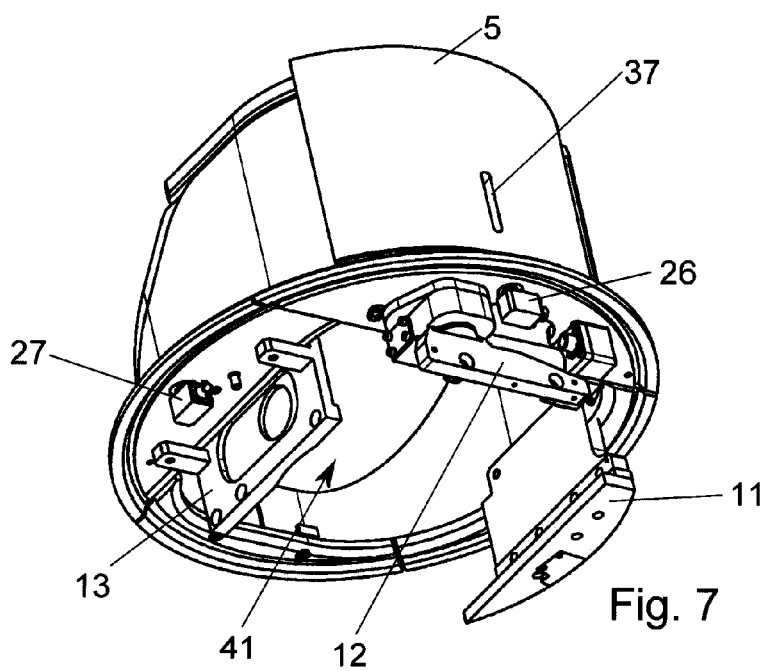
FIG. 7 shows another perspective view of the protective device of FIG. 6.
Figure 8:
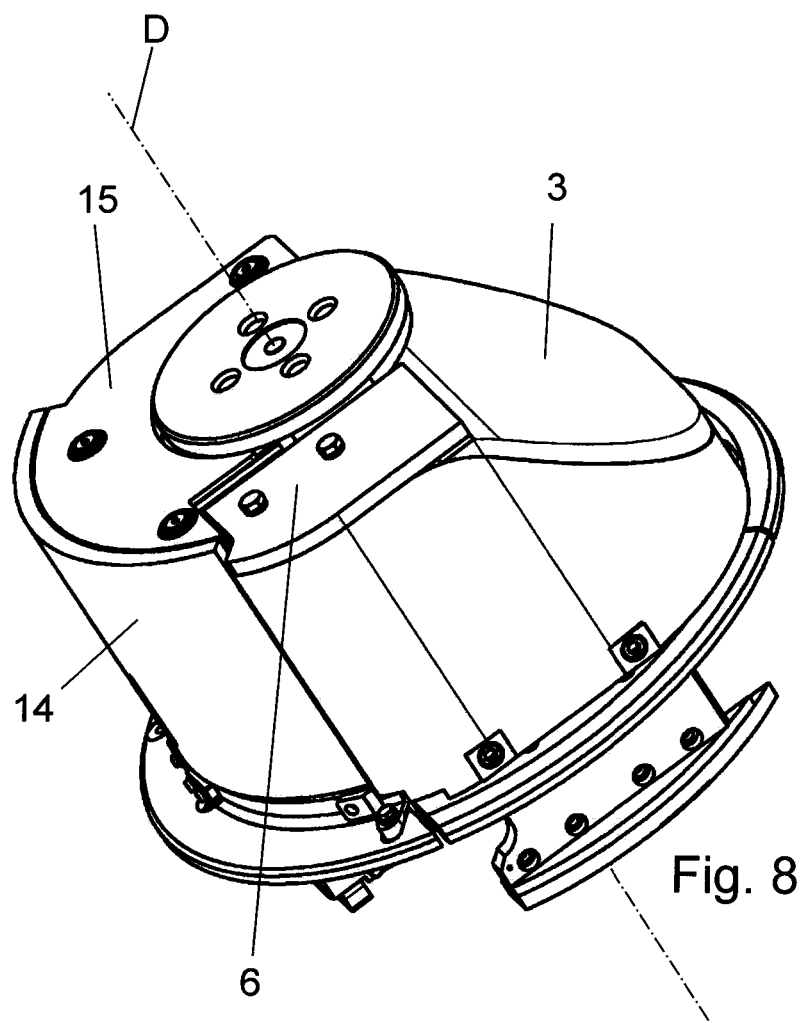
FIG. 8 shows another perspective view of the protective device of FIG. 6.

FIGS. 6 to 8 show the protective device 1 with closed closing flap 5. As can be seen in FIGS. 6 and 7, the curved plate 14 of the closing flap 5 has a slot 37. Through this slot 35, one can view the outside with the lens 2 even when the closing flap 5 is shut.

Furthermore, the closing flap 5 has adjustment pieces 28, 29 for the end switches 26, 27 through which the drive unit 30 is switched off upon reaching the open or closed position. The end switch 26 is activated by the adjustment piece 28 upon reaching the closed position and the end switch 27 by the adjustment piece 29 upon reaching the open position.

The protective hood is secured to the lens 2 by the connection elements 11, 12, and 13.

Figure 9:
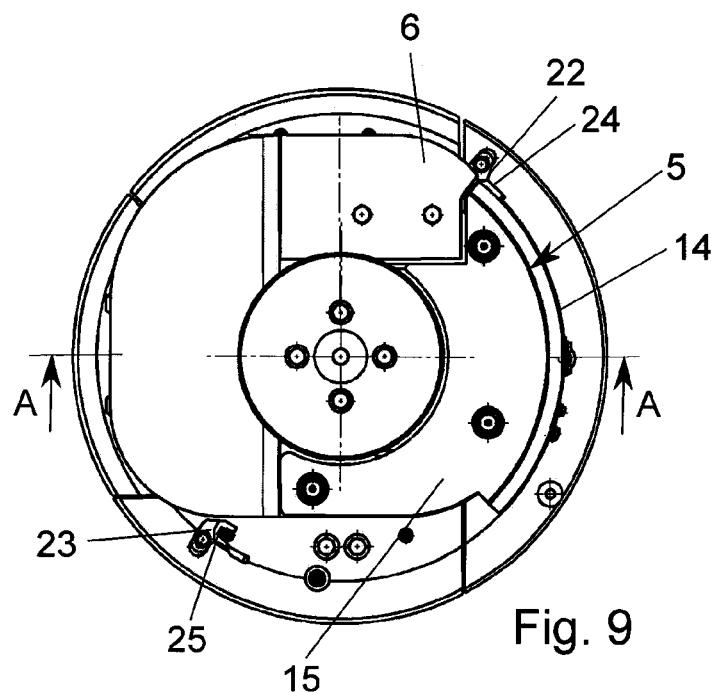
FIG. 9 shows a top view of the protective device of FIG. 6.

FIG. 9 shows the protective device 1 from above in the closed state. As this view shows, the closing flap 5 moves in the rotation contour of the protective device 1 upon opening and closing, and even within the rotation contour of the protective hood 3 in the sample embodiment.

Also clearly seen in this view are the stops 22, 23, as well as the end position fixations 24, 25. The stops 22, 23 have a dovetail guide. In this way, the closing flap can be guided additionally by the latter. The stop 22 and the end position fixation 24 are designed as a single piece and serve as an end stop and end position fixation for the closing flap 5 in the closed position. The stop 23 and the end position fixation 25 are likewise designed as a single piece and serve as an end stop and end position fixation for the closing flap 5 in the open position.

For opening and closing the closing flap 5, the closing flap 5 rotates by 80 degrees between these two end stops 22, 23 in the sample embodiment.

Figure 10:
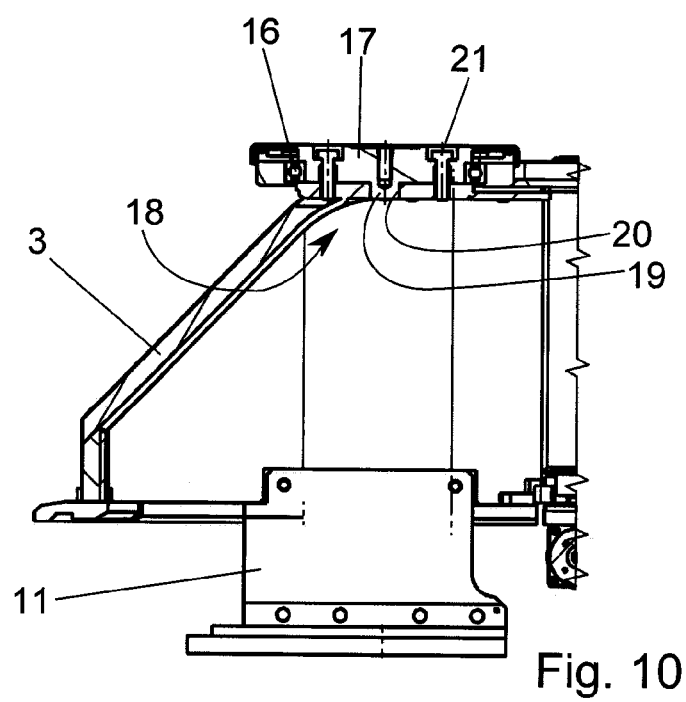
FIG. 10 shows a sectional side elevational view of the protective device, taken along line A-A of FIG. 9.

FIG. 10 shows the protective device 1 in a cross section along line A-A of FIG. 9. This view shows the upper bearing of the closing flap 5 on the protective hood 1. The closing flap 5 is joined by a bearing cover 17 and the ball bearing 18 to the protective hood 3. Using this design, the closing flap 5 can easily be removed from the protective hood 3 to decrease the design height. For this, all that needs to be done is to loosen the four connection elements 21 and remove them along with the bearing cover 17 and the closing flap 5 from the protective hood 3.

To enable the simplest and fastest possible mounting of the closing flap 5 back into place, the bearing cover 17 has a pin 19. By means of this and the corresponding recess 20 in the protective hood 3, the position of the closing flap 5 relative to the protective hood 3 is established. The pin 19 and the recess 20 thus form an adjustment device 18 facilitating the assembly process.

Figure 11:
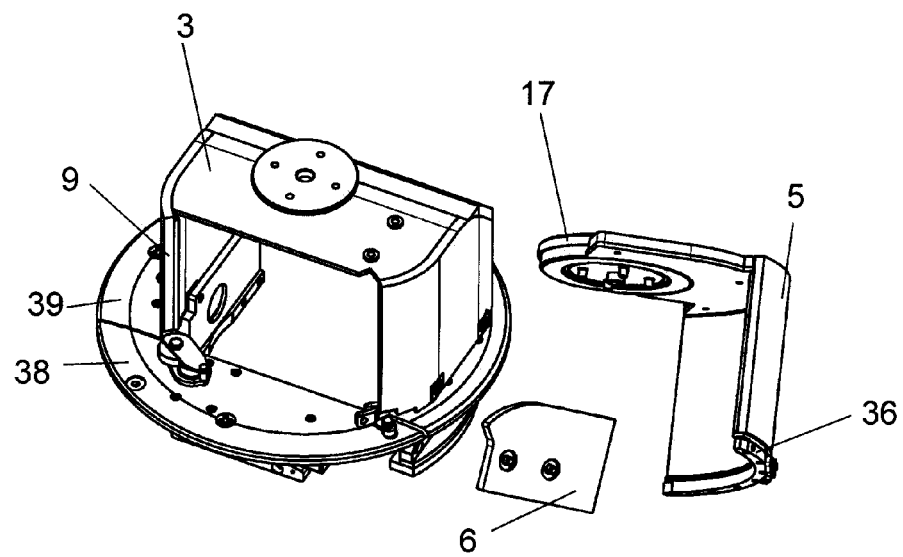
FIG. 11 shows a protective device with closing flap removed.
Figure 12:
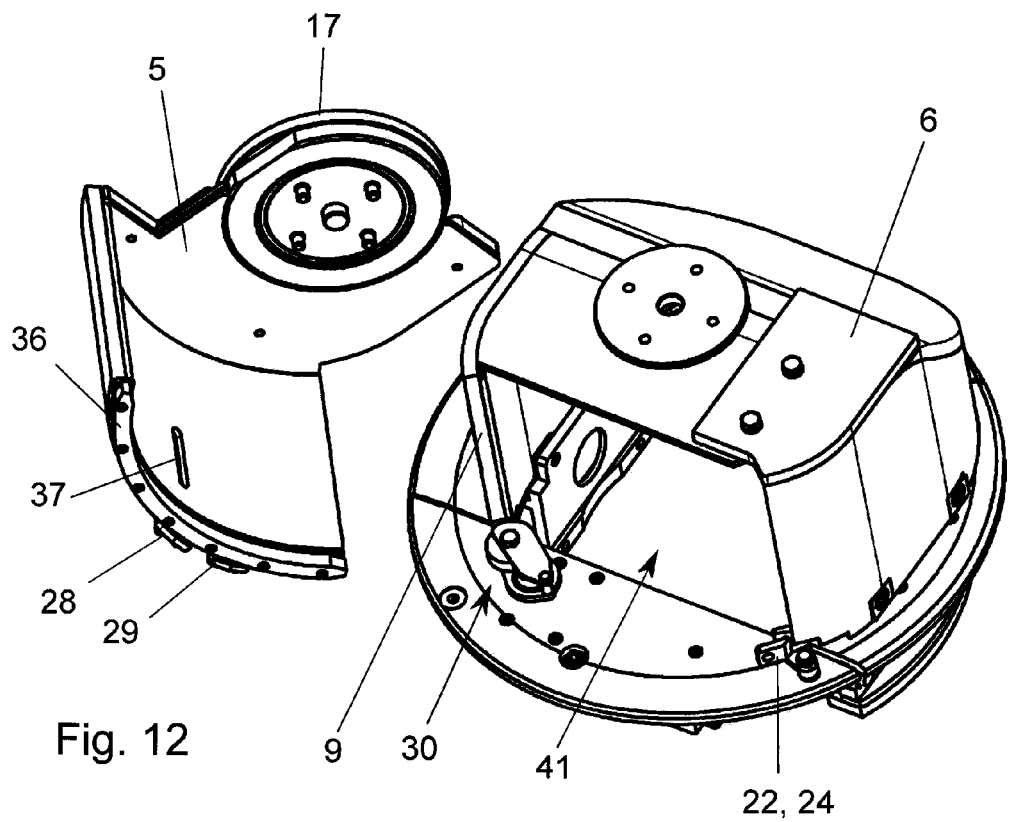
FIG. 12 shows another view of a protective device with closing flap removed.

FIGS. 11 and 12 show the protective hood 3 with closing flap 5 removed. By the removal of the closing hood 5 with the bearing cover 17 and the top panel 6, the height of the protective device 1 can be reduced, so that the maximum stowage dimensions of a vehicle with protective device 1 mounted on the roof can be adhered to.

The closing flap 5 has a toothed segment 36, by which it can be driven by the drive unit 30. The toothed segment 36 is arranged on the cylinder surface segment 14 in the base region of the closing flap 5. On the outside of this toothed segment 36 are mounted the adjustment pieces 28, 29 for the end switches 26, 27. For the movement of the adjustment pieces 28, 29, these have oblong holes. In this way, the switch points can be set by the adjustment pieces 28, 29 and do not have to be set by moving the end switches 26, 27.

In what follows, the drive unit 30 for the closing flap will be described with the aid of FIGS. 13 and 14. The drive unit 30 comprises a motor 31, which in the sample embodiment is designed as an electric motor. Alternatively, however, a pneumatic or hydraulic motor can be used. In order to make possible an easier emergency opening and closing of the closing flap 5, the drive unit 30 has a friction clutch, not shown.

The flow of force from the motor 31 to the closing flap 5 is especially apparent in FIG. 14. A worm gear 33 is arranged on the motor 31. The worm gear 33, in turn, is connected by a friction clutch, not shown, to a spur gearing 32, 34. Alternatively, the friction clutch can be arranged between the motor 31 and the worm gear 33. Then a spur gearing 32, 34 is connected downstream from the worm gear. The friction clutch can be integrated in the worm gear. The spur gearing 32, 34 in turn transfers the driving torque of the motor to the toothed segment 36 of the closing flap. Instead of a spur gearing, two spur gearings 32, 34 can transfer the motor torque to the closing flap as shown in the sample embodiment. These can also be designed as a two-stage spur gearing. The spur gearing 34 has a driving rack 40 and a driven rack 35. The driven rack 35 drives the closing flap 5 across its toothed segments 36.

The spur gearing 34 can be pivotable in order to equalize the tolerance between drive unit 30 and closing flap 5, in particular, it can pivot about the axis of rotation of the driving rack 40.

Moreover, the protective device 1 has a mounting ring 38, 39. In the sample embodiment, the mounting ring 38, 39 is in two parts. The protective hood 3 is arranged on the mounting ring 38, 39. The mounting ring 38, 39 serves as a connection flange for the protective device 1 and the lens 2 to the vehicle. The mounting ring 38, 39 is also fastened a rotary bearing arranged on the vehicle roof or vehicle turret, so that the protective device 1 and the entire optical device 10 can rotate in azimuth relative to the turret or the vehicle.

Preferably the end switches 26, 27 are arranged protected underneath the mounting ring 38, 39 so that only their push buttons extend outside the vehicle. The drive unit 30 is also, for the most part, arranged beneath the mounting ring 38, 39. As shown by FIG. 13, the motor 31, the worm gear 33 and the friction clutch (not shown) as well as the spur gearing 32 are arranged protected beneath the mounting ring 38, 39 and only the spur gearing 34 is arranged outside of it.

By means of the protective device 1 according to the invention and the optical device 10 according to the invention, with the protective hood 3 and the closing flap 5, a protection is provided for the lens 2 which can be opened and closed within the rotation contour of the optical device 10. Furthermore, the forces needed to open and close the closing flap 5 are substantially reduced and the inertia of the closing flap 5 is decreased. This also enables substantially smoother opening and closing of the closing flap 5 and further improves the protection of the lens 2.

REFERENCE SYMBOLS 1 protective device
2 lens
3 protective hood
4 sight opening
5 closing flap
6 top panel
7 tripod
8 additional device
9 edge of the sight opening
10 optical device
11 connection element
12 connection element
13 connection element
14 curved plate
15 leg
16 ball bearing
17 bearing cover
18 adjusting device
19 pin
20 recess
21 connection element
22 stop (closed position)
23 stop (open position)
24 end position fixation device (closed position)
25 end position fixation device (open position)
26 end switch (closed position)
27 end switch (open position)
28 adjusting piece for end switch (closed position)
29 adjusting piece for end switch (open position)
30 drive unit
31 motor
32 spur gearing
33 worm gear
34 spur gearing
35 driven rack
36 toothed segment
37 slot
38 mounting ring
39 mounting ring
40 drive rack
41 lens mount
D axis of rotation

The invention claimed is:

1. A protective device for a lens (2) contained in a lens mount of an optical device, the protective device comprising:
    a protective hood (3) for protecting the lens mount in an interior thereof against ballistic effects, the protective hood having a sight opening (4) for the lens (2);
    a closing flap (5) for closing the sight opening, the closing flap mounted on the protective hood for rotation relative to the protective hood (3), wherein an axis of rotation (D) of the closing flap (5) runs through the lens mount (41), the closing flap being rotatably mounted on a top side of the protective hood, and the axis of rotation of the closing flap is oriented parallel to an azimuth axis of rotation of the optical device.

2. The protective device as claimed in claim 1, wherein the closing flap (5) is led along the outside of the protective hood (3).

3. The protective device as claimed in claim 1, wherein the closing flap (5) rotates along an outer contour of the protective hood (3).

4. The protective device as claimed in claim 1, wherein the closing flap (5) is additionally rotatably mounted on a base of the protective hood (3).

5. The protective device as claimed in claim 1, wherein the protective hood and the closing flap (5) are coupled to the lens (2) such that the protective hood rotates in azimuth with a positioning drive unit of the lens (2), so that the visual field of the lens is oriented in azimuth along with a sight opening of the protective hood.

6. The protective device as claimed in claim 1, wherein the closing flap (5) is removably mounted on the protective hood (3).

7. The protective device as claimed in claim 1, further comprising a drive unit (30) for rotating the closing flap (5).

8. The protective device as claimed in claim 1, wherein the aperture of the sight opening (4) is less than 120 degrees.

9. The protective device as claimed in claim 1, wherein the closing flap (5) includes a curved plate (14).

10. An optical device selected from an angled mirror and a periscope, the optical device comprising: a lens; and the protective device (1) of claim 1 for the lens.

11. A vehicle comprising the optical device (10) as claimed in claim 10.

12. The protective device for a lens as claimed in claim 1, wherein the closing flap includes a cylinder surface segment and a leg by which the closing flap is mounted on the protective hood.

13. The protective device for a lens as claimed in claim 12, further comprising an upper bearing connecting the leg to the protective hood.

14. The protective device for a lens as claimed in claim 13, further comprising a bearing cover over the upper bearing and joining the closing flap to the protective hood.

15. The protective device for a lens as claimed in claim 1, further comprising a plate positioned to cover a surface on the top side of the protective hood that is not covered by the closing flap.

16. The protective device of claim 1, further comprising a mounting ring, wherein the protective hood is arranged on the mounting ring.

17. The protective device of claim 16, further comprising a drive unit that opens and closes the closing flap relative to the protective hood, and wherein the drive unit is mounted on the mounting ring.

18. A protective device for a lens (2), the protective device comprising:
    a protective hood (3) for protecting a lens mount containing the lens in an interior thereof against ballistic effects, the protective hood having a sight opening (4) for the lens (2); and
    a closing flap (5) for closing the sight opening, the closing flap mounted on the protective hood for rotation relative to the protective hood (3), wherein an axis of rotation (D) of the closing flap (5) runs through the lens mount (41),
    wherein a selected one of a bearing cover (17), the closing flap (5), and the protective hood (3) has an adjusting device (18) for orienting the closing flap (5) when installing the closing flap (5) on the protective hood (3).

19. A protective device for a lens (2), the protective device comprising:

a protective hood (3) for protecting a lens mount containing the lens in an interior thereof against ballistic effects, the protective hood having a sight opening (4) for the lens (2);

a closing flap (5) for closing the sight opening, the closing flap mounted on the protective hood for rotation relative to the protective hood (3), wherein an axis of rotation (D) of the closing flap (5) runs through the lens mount (41); and at least one end switch (26, 27) to detect an open position and a closed position of the closing flap (5).

20. A protective device for a lens (2), the protective device comprising:

a protective hood (3) for protecting a lens mount containing the lens in an interior thereof against ballistic effects, the protective hood having a sight opening (4) for the lens (2);

a closing flap (5) for closing the sight opening, the closing flap mounted on the protective hood for rotation relative to the protective hood (3), wherein an axis of rotation (D) of the closing flap (5) runs through the lens mount (41); and an end position fixation device (24, 25) for the closing flap (5) when the closing flap is in an open position and is in a closed position.

* * * * *